Aug. 7, 1956  C. E. MENDEZ  2,757,808
DISMANTLABLE CONVEYOR ASSEMBLY FOR VEHICLES
Filed April 19, 1955  2 Sheets-Sheet 1

INVENTOR.
CHARLES E. MENDEZ
BY
ATTORNEYS

Aug. 7, 1956     C. E. MENDEZ     2,757,808
DISMANTLABLE CONVEYOR ASSEMBLY FOR VEHICLES
Filed April 19, 1955     2 Sheets-Sheet 2
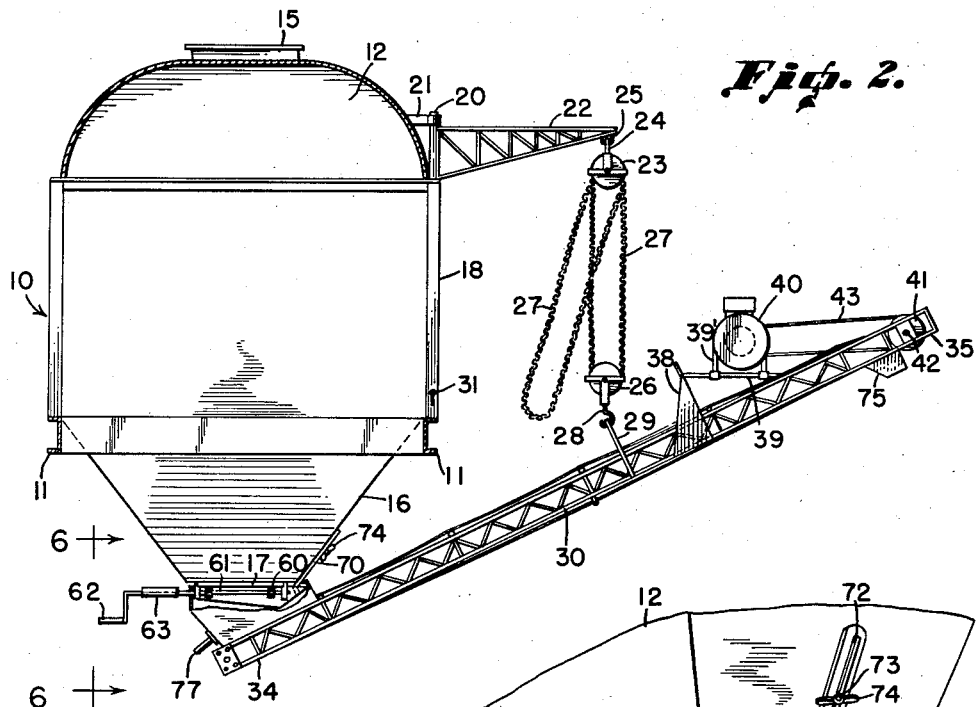
*Fig. 2.*
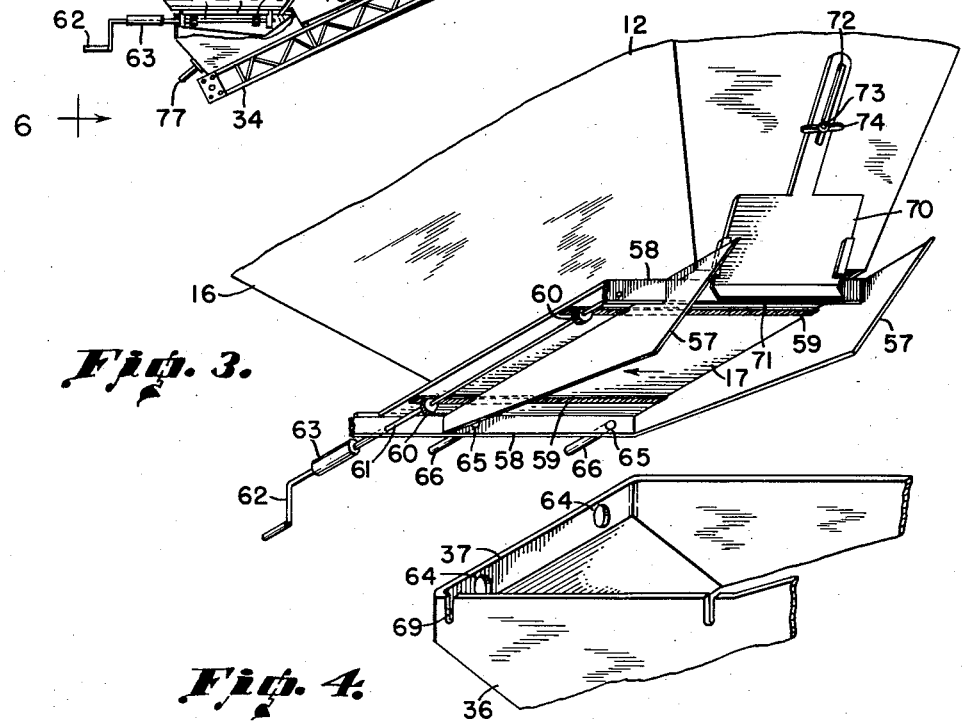
*Fig. 3.*
*Fig. 4.*
INVENTOR.
CHARLES E. MENDEZ
ATTORNEYS

United States Patent Office 2,757,808
Patented Aug. 7, 1956

2,757,808

DISMANTLABLE CONVEYOR ASSEMBLY FOR VEHICLES

Charles E. Mendez, Tampa, Fla.

Application April 19, 1955, Serial No. 502,312

7 Claims. (Cl. 214—83.26)

The present invention relates to improvements in hoppers for vehicles and, more particularly, to simple, efficient, and economical dismantlable means for withdrawing the material from a vehicle hopper at any suitable point of discharge.

An important object consists in providing a vehicle, such as a trailer or the like, with one or more fixed hoppers for receiving and transporting the material. Associated with the vehicle hopper is a dismantlable conveyor frame having a receiving hopper arranged to register and be connected to the vehicle hopper, when the parts are in their unloading position. The dismantlable frame is normally carried in an inoperative position under the trailer and is moved to an operative or unloading position and maintained at any desired angle, by rotatable means on one side of the vehicle, so that the material carried by the vehicle may be discharged therefrom at any suitable point at a minimum expenditure of time, labor and cost. Conversely, when the unloading operation is completed, the conveyor frame is disconnected from the vehicle hopper and returned to its inoperative position by the rotatable means.

A still further object consists in a new and improved method of unloading material from a vehicle hopper by use of a dismantlable conveyor belt assembly which in its inoperative position is carried by the underside of the vehicle and may be readily moved and connected to the vehicle hopper at a minimum expenditure of time and effort.

Other objects and advantages of the invention will become apparent from the following description, when taken in conjunction with the accompanying claims and drawings.

Referring to the drawings, in which is shown a preferred embodiment of the invention:

Figure 2 is a sectional view taken substantially along the line 2—2 of Figure 1, but showing the conveyor frame connected to the vehicle hopper and raised to its unloading position;

Figure 3 is a detailed perspective view showing the bottom construction of the vehicle hopper;

Figure 4 is a detailed perspective view of the upper portion of the receiving hopper carried on the conveyor frame;

Figure 5 is a detailed side view with parts in section and broken away so as to show the connection of the vehicle hopper with the conveyor hopper; and Figure 6 is a sectional view taken substantially along the line 6—6 of Figure 2.

Figure 1:
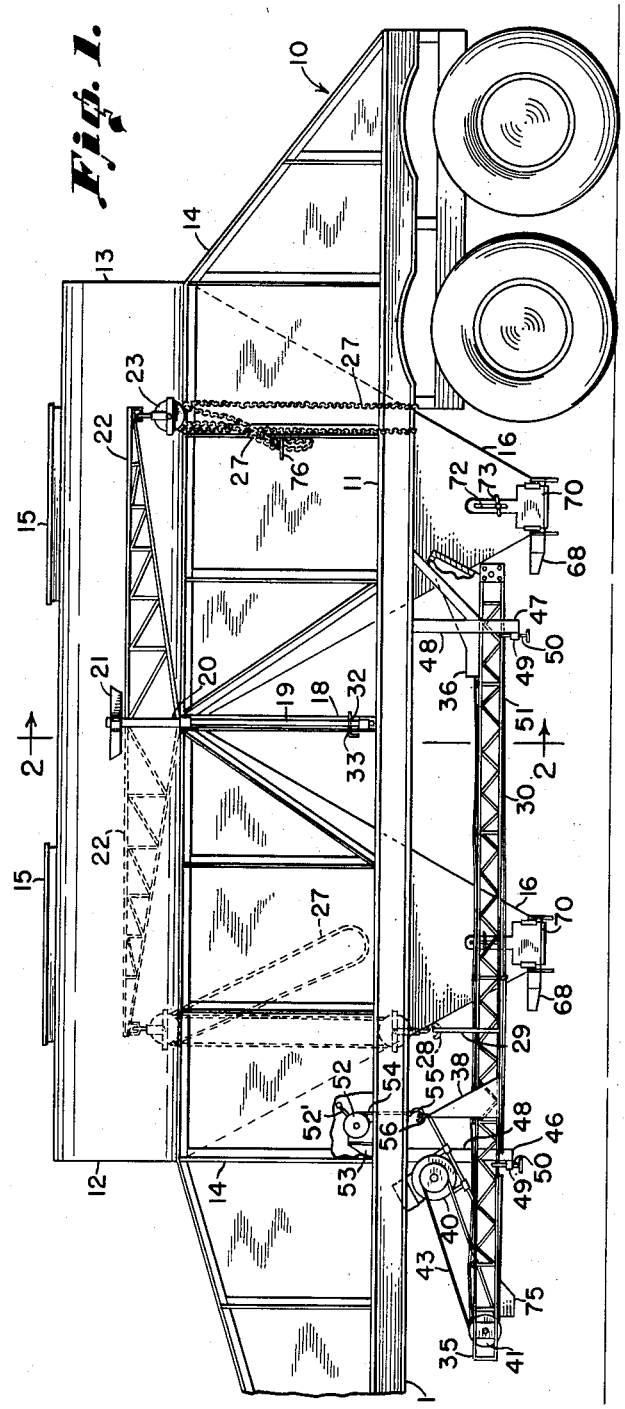
Figure 1 is a side view of the rear end portion of a semi-trailer provided with a hopper and conveyor assembly constructed in accordance with the present invention.

For the purpose of illustration, the vehicle for receiving and transporting the material is shown in the form of a semi-trailer 10 provided with the longitudinally extending spaced side sills or channel bars 11 (Fig. 2), between which may be mounted one or more material-receiving hoppers 12 and 13 carried by the frame assembly 14. Each of the vehicle or receiving hoppers has an inlet opening 15 into which may be discharged any suitable material, such as rock, coal, pulverized products, and the like, which are to be carried by the trailer and unloaded at any suitable point of discharge. Each of the receiving hoppers 12 and 13 may have a converging discharge portion 16 at its lower end (Fig. 1), the bottom of which is closed by a slidable floor or gate valve 17 (Fig. 3) in a manner subsequently to be described.

A tubular member 18 (Fig. 1) is preferably disposed vertically and medially between the receiving hoppers 12 and 13 adjacent one side thereof, and receives an elongated rotatable rod 19 which extends upwardly therefrom as at 20 and is maintained rotatably in a fixed position by a bracket 21 (Fig. 2) connected to an adjacent side of the vehicle. Fixed or non-rotatably connected to the upper portion 20 of the rod 19 is a swinging boom or arm 22. An upper pulley or sheave 23 may be detachably connected by a hook 24 to an eye or loop 25 on the outer end of the boom 22. A lower pulley 26 is connected to the upper pulley 23 by an endless chain 27 and has a depending hook 28 arranged to be detachably connected to the fixed strap 29 carried by the conveyor frame 30. In order to maintain or lock the boom 22 either in its outward position, as shown in full lines in Figure 2, or in its retracted position, the tubular member 18 and rod 19 may be provided with circumferentially spaced openings 31 and 32 for receiving a removable locking pin 33 when these openings are moved into transverse registration (Fig. 1). The conveyor may be considered as having an inner or lower end 34 and an outer or upper end 35 (Fig. 2). To the lower end 34 is connected a receiving hopper or trough 36 having an upper rectangular flange portion 37 (Fig. 4) of substantially the same configuration as the bottom of the discharge hopper 16, so as releasably to fit the same. The opposite or upper end 35 of the conveyor frame may have connected thereto, a pair of spaced fixed triangular-shaped brackets 38 (Fig. 2) and a pair of supporting rods 39 on which is secured any suitable motor, such as a gasoline engine 40 by the clamping bars 39'. The motor 40 is operatively connected to a pulley 41 fixed to a transverse drive shaft 42, by the endless belt 43. An endless conveyor belt 44 extends longitudinally of the frame 30 and is trained over at opposite ends of the conveyor frame, the upper pulley 41 and the lower pulley 45 (Fig. 5). Thus, it will be seen that when the motor 40 is in operation, it will cause the longitudinal movement of the endless belt 44.

Normally, the conveyor frame 30 is detachably and separately mounted beneath the vehicle or trailer 10 in any suitable manner, such as by the spaced transversely disposed U-shaped members or hangers 46 and 47 which have their side arms 48 extending downwardly from the sills or channel members 11. Clamping means, such as interiorly threaded bosses or lugs 49, extend outwardly and laterally in transverse pairs from opposite sides of the U-shaped supporting members 46 and 47. Each of the bosses 49 receives a manually operated threaded rod 50 (Fig. 1) which has a hooked upper end arranged to overlap and engage the adjacent flange 51 of the conveyor frame, so that, when the rod 50 is moved downwardly, the hook portion will engage the flange 51 to releasably maintain the conveyor frame and its associated parts in a fixed position beneath the vehicle. In order to further assist in maintaining the conveyor frame 30 in proper position when being transported from place to place, a drum or winch 52 is transversely mounted by a bracket 53 to a sill 11 (Fig. 1) of the vehicle. A flexible member, such as a cable or the like 54, has one end portion thereof wound on the drum 52 and its opposite end connected to a hook 55 which is arranged to be detachably connected to an eye or loop 56 carried by the bracket 38 on the conveyor frame 30, so that when the flexible member 54 is wound on the drum 52 by the rotation of handle 52' to a certain point, it will tend to assist in supporting the outer end 35 of the conveyor frame when the latter is supported in its inoperative or dismantlable position.

The lower end of each of the receiving hoppers 16 may be of square or rectangular shape and has depending metal longitudinal and transverse flanges 57 and 58, respectively (Fig. 3), enclosing the discharge opening in the vehicle hopper 16 controlled by the slidable floor or gate 17. The underside of the floor or gate 17 is provided with spaced parallel rack bars 59 which mesh with the spaced pinions 60 carried by an operating shaft 61 to which a manually operated crank or handle 62 may be detachably connected as at 63. The upper flange 37 in the receiving hopper 36 of the conveyor 30 is provided with spaced openings 64 (Fig. 4) arranged to register with complementary formed openings 65 in the adjacent flange 58 on each of the vehicle hoppers 16 to receive a locking bolt 66 so as to detachably connect the receiving hopper 36 and the frame conveyor 30 to the hopper 16, when the conveyor frame 30 is in its operative or unloading position (Fig. 2). The inward movement of the bolts 66 into the holes 64 may be controlled by the removable stop pin 67 (Fig. 6), connected by a chain 67' to a side of hopper 36.

Each of the vehicle hoppers 16 has extending laterally from one side thereof, a housing 68 (Fig. 1) into which slides the adjacent end of the movable floor or bottom 17 when the latter is moved by rotation of the handle 62 to its open position, in order to allow the material in the hopper 16 to be discharged into the receiving hopper 36 and onto the lower end of the endless conveyor belt 44. The upper portion of the hopper 36 has spaced slots or grooves 69 (Fig. 4) into which extend the depending flanges 58 when the receiving hopper 36 is moved into registration with the discharge hopper 16 so as to maintain the hoppers in alignment during the unloading operation. A slidable control valve or gate 70 may be shaped, as shown in Figure 3, and has a depending angularly disposed marginal edge portion or end 71 (Fig. 5) arranged to extend transversely across and above the belt 44 as the latter moves upwardly through the hopper 36. The valve 70 may have an intermediate reduced portion 71 provided with an elongated slot 72 through which extends a threaded bolt 73 from the inner side of the hopper 16, and which receives a wing nut 74 to vertically adjust the position of the control gate 70 relative to the belt 44 for the purpose of regulating the amount of material being carried upwardly by the belt 44 from the hopper 16 to the discharge spout 75 (Fig. 2).

Assuming that the semi-trailer is used for transporting rock or other pulverized material from one place to another, each of the hoppers 12 and 13 on the trailer 10 is first loaded at the point of origin. The conveyor frame 30 and its associated parts are maintained in their stored inoperative position under the trailer by the clamping bolts 50 and the flexible cable 55 which now is tightened up on the drum or winch 52, so that the parts will be maintained firmly in a fixed position, as particularly shown in Figure 1. Upon arrival at the point where the material is to be discharged, the trailer 10 is parked and the conveyor 30 is moved to its unloading position by first releasing the clamps 50. The chain hoist 27 now is in its inoperative position and has the hook 28 thereof connected to the underside of the adjacent channel bar 11 by tightening up the chain (Fig. 1). A retaining pin 76 on the side of the trailer 10 may be used to maintain or hold the endless chain 27 in an out-of-the-way position (Fig. 1). The chain hoist 27 is then loosened so as to remove the hook 28 from bar 11. The pin 32 is withdrawn from the rod and the boom 22 is rotated from its full line position, as shown in Figure 1, to its dotted line position, so that the hook 28 is swung to engage the lifting handle 29 on the conveyor frame 30. The slack is then taken up on the chain hoist 27 and as the clamps 50 have been previously released the conveyor frame 30 will still be supported by the U-shaped member 47 at the inner end thereof and by the winch 52 at its opposite end. The winch 52 is then unwound so as to release the hook 55 from the eye on the bracket 38 so that the conveyor frame 30 will now be supported by the chain hoist 27 and the boom or crane means 22. With the outer end 41 of the conveyor frame suspended by the chain hoist 27, the operator upon the application of slight pressure to the conveyor frame withdraws it from the supporting member 47 so that the conveyor is now entirely suspended on the chain hoist 27. The operator then grasps the handle 77 (Fig. 2) on the receiving hopper 36 and swings the conveyor frame so that the hopper 36 is moved into registration with the lower end of the vehicle hopper 16, as shown in Figure 2. Upon registration of the openings 64 in the hopper 36 with the openings 65 in the hopper 16, the bolts 66 are inserted into the hoppers and limited in their inward movement by the pins 67. The chain hoist 27 is then operated to raise or adjust the frame conveyor 30 to the desired unloading angle. The motor or engine 40 carried by the conveyor frame 30, is then started so as to operate the endless belt 44. The slidable door or gate 17 is then opened by the crank handle 62 the proper distance, to allow the desired amount of material to fall into the receiving hopper 36 and onto the lower end of the endless belt 44 so as to be carried upwardly and discharged through the outlet 75 at the unloading point. The gate valve 70 is regulated to control the amount of material being carried on the conveyor belt and the gate 70 is maintained in desired adjusted position by the wing nut 74. When the unloading operation is completed, the conveyor frame 30 is disconnected from the vehicle hopper 16 and returned by the boom 22 and chain hoist 27 so as again to be positioned beneath the trailer 10 and be supported by the U-shaped members 46 and 47. The conveyor frame 30 and the parts movable therewith are maintained in a fixed position by the retaining bolts 50 and drum 52 in the manner as previously described. The control gate 70 which regulates the flow of material onto the belt 44 provides means for preventing cave-ins of the material. In other words, by adjusting the control gate 70 the slidable door 17 may be left wide open so that no matter how much of a cave-in there is, the flow of the material onto the belt 44 will be even and uniform.

The conveyor frame 30 is shown in Figure 5 in its elevated working position. The entire conveyor assembly may pivot or rotate downwardly about a horizontal axis due to the diameters of the openings 64 being larger than the diameter of the pin or bolt 66 (Fig. 6). Moreover, the locking pin 66 does not hold the conveyor hopper 36 tight against the trailer hopper 12 but is loosely connected thereto. The chain 67' is of such length that the pin 67 may enter into either one of the spaced bolts 66 so as releasably to lock these parts in position. The spaced flanges or plates 57 are so shaped or longitudinally tapered that, when the conveyor discharge end is moved to a lower working height, the depending flanges 57 maintain a seal at opposite sides of the hopper 36. At the same time, the control gate 70 is adjusted or lowered to regulate the amount of discharge of the material onto the conveyor.

Thus, it will be seen that simple, efficient, and economical means are provided for conveying any suitable material in a vehicle hopper such as a semi-trailer, truck, freight train, or the like and discharging it by means of a dismantlable conveyor belt assembly that is carried by the vehicle when not in use, in an out-of-the-way position and is readily moved and maintained in its unloading position, at a minimum expenditure of time, labor, and cost. Due to the fact that the conveyor frame 30 is not permanently connected to the vehicle, the conveyor frame may readily be repaired or replaced without causing the vehicle or trailer to be out of commission when the conveyor frame and its associated parts are undergoing repair. In other words, a serious defect in conveyors or self-loading devices of this type, as heretofore made, has been that the conveyors form a part of the vehicle or trailer so that, when anything goes wrong with the conveyor and it needs repair or replacement, the whole trailer must be put out of service until the trouble is repaired. By reason of the independent or detachable connection of the conveyor frame 30, another conveyor may be substituted at a minimum expenditure of time, effort, and cost, while repairs are being made. Moreover, the conveyor frame in its inoperative position is carried under the trailer, so as to be conveniently accessible so as to be moved without any strain on the operator, to its operative position and be pivotally connected to the trailer or be returned to its inoperative position.

It will be understood that the form of the invention shown is merely illustrative and that such changes may be made as come within the scope of the following claims.

I claim:

1. In combination with a wheeled vehicle having a fixed hopper body provided with a discharge opening, a separate frame-mounted conveyor movable from a stored inoperative position under the vehicle body to an operative position extending outwardly and upwardly from one side of the vehicle, means under the vehicle between the front and rear wheels thereof for releasably supporting the conveyor when in its inoperative position, said conveyor having an inner end and an outer end, a receiving hopper connected to the conveyor adjacent the inner end thereof and arranged to be moved so as to register with the discharge opening in said fixed hopper when the conveyor is moved to its operative position, means when said hoppers are in registration for pivotally connecting the receiving hopper to the fixed hopper for adjusting the same about a horizontal axis, said conveyor including an endless belt longitudinally movable on the conveyor frame, and crane means for moving the conveyor frame from its inoperative position under the vehicle to its operative position or from its operative position to its inoperative position.

2. In combination with a vehicle having a fixed hopper provided with a discharge opening, a separate conveyor frame movable from an inoperative position under the vehicle to an operative position extending outwardly and upwardly from one side of the vehicle, means for releasably supporting the conveyor frame when in its inoperative position under the vehicle, said conveyor frame having an inner end and an outer end, a receiving hopper connected to the conveyor frame adjacent the inner end thereof and arranged to be moved so as to register with the discharge opening in said fixed hopper when the conveyor frame is in its operative position, means when the hoppers are in registration loosely pivotally connecting the receiving hopper to the fixed hopper about a horizontal axis, said fixed hopper having longitudinally spaced depending flanges overlapping the adjacent sides of the receiving hopper when the conveyor frame is in its operative position, so as to provide a seal when the conveyor frame is lowered relative to the fixed hopper, a conveyor belt longitudinally movable on the conveyor frame, a swinging boom connected to one side of the vehicle, and means for detachably connecting the boom to the conveyor frame for moving the latter from its inoperative position to its operative position or from its operative position to its inoperative position.

3. In combination with a vehicle as called for in claim 2 in which said boom is provided with means operable when the conveyor frame is connected to the fixed hopper for raising and maintaining the conveyor frame at the desired unloading angle, and means for operating said conveyor belt.

4. The combination as called for in claim 1, in which means are provided when the conveyor frame is lowered about said pivotal connection for forming a seal between the sides of the receiving hopper and the fixed hopper.

5. The combination as called for in claim 1, in which means are provided for uniformly distributing the material on the conveyor belt as it issues from the receiving hopper.

6. In combination with a vehicle having a fixed hopper provided with a discharge opening, a separate conveyor frame, means for supporting the conveyor frame in an inoperative position under the vehicle, means for releasably maintaining the conveyor frame in its inoperative position, said conveyor frame having an inner end and an outer end, a receiving hopper connected to the conveyor frame adjacent the inner end thereof and arranged to be moved to an operative position and in registry with the discharge opening in said fixed hopper, means for loosely pivotally connecting the receiving hopper to the fixed hopper about a horizontal axis, an endless belt longitudinally movable on the conveyor frame, a swinging boom connected to one side of the vehicle, means for detachably connecting the boom to the conveyor frame for moving the receiving hopper from its inoperative position to its operative position so as to register with said fixed hopper, and be pivotally connected thereto, said fixed hopper having an adjustable control member extending transversely across the conveyor belt adjacent the receiving hopper so as to uniformally distribute the material onto the conveyor belt, and said fixed hopper having spaced longitudinally extending tapered depending flanges engaging opposite sides of the receiving hopper so as to form a seal therebetween when the conveyor frame is lowered relative to the fixed hopper.

7. In combination with a wheeled vehicle as called for in claim 1, in which the means under the vehicle for supporting the conveyor includes longitudinally spaced hangers, and clamping means connected to the hangers for releasably engaging the conveyor to maintain the same in a fixed position beneath the vehicle.

References Cited in the file of this patent

UNITED STATES PATENTS

| | | |
|---|---|---|
| 2,093,300 | Adams et al. | Sept. 14, 1937 |
| 2,332,729 | Klosterman | Oct. 26, 1943 |
| 2,564,020 | Mengel | Aug. 14, 1951 |
| 2,585,414 | Steffens | Feb. 12, 1952 |
| 2,589,988 | Bruno | Mar. 18, 1952 |
| 2,616,579 | Kill | Nov. 4, 1952 |